Patented Oct. 9, 1951

2,570,463

UNITED STATES PATENT OFFICE 2,570,463

PROCESS FOR PREPARING ORGANOSILANES

Maurice Leon Ernsberger and Robert De Wald Lipscomb, Wilmington, Del., assignors to E. I. du Pont de Nemours & Company, Wilmington, Del., a corporation of Delaware No Drawing. Application January 30, 1948, Serial No. 5,507

7 Claims. (Cl. 260—448.2)

This invention relates to organic compounds of silicon and more particularly to cycloaliphatic compounds of silicon and to a method for their preparation.

This invention has as an object the preparation of 1:1 adducts of cycloalkenes and halosilanes containing at least one hydrogen on silicon. A further object is the provision of a process therefor. Other objects will appear hereinafter.

These objects are accomplished by the following invention wherein a halosilane having hydrogen and halogen on the one silicon is reacted in the liquid phase with a cycloalkene in the presence of a free radical-yielding catalyst or of actinic light.

The free radical-liberating catalysts which are particularly useful in initiating this reaction are compounds having the general formula RXXR', wherein R is a monovalent organic radical, R' is a monovalent organic radical or hydrogen, and X is an element of integral atomic number of 7 to 8, i. e., oxygen or nitrogen. The preferred type of free radical-generating catalyst used in the process of this invention is an organic azo compound wherein the azo, —N=N—, group is acyclic and bonded from both of the nitrogens to different carbons. Particularly preferred are those azo compounds wherein both valences of the acyclic azo group are attached to different carbons which are non-aromatic, i. e., aliphatic or cycloaliphatic, and at least one of which is tertiary, which tertiary carbon has further attached to it through another carbon a negative radical in which the three remaining valences of the latter carbon are satisfied by at least one element of atomic number 7 to 8 (nitrogen and/or oxygen), i. e., the nitrile, carbalkoxy, and carbonamide groups. Carbalkoxy groups in which the alkyl group contains from one to six carbon atoms are preferred. The negative radical in general is neutral with respect to acidity, and of these neutral radicals the nitrile is preferred since the azonitriles are readily obtained and have high activity. Still more preferred are the symmetrical azo compounds having two tertiary carbons attached to the azo nitrogens and these negative groups attached to the tertiary carbons, since they are active as catalysts at lower temperatures than the unsymmetrical compounds. These particular azo compounds are preferred since they are effective in catalyzing the reaction in reaction vessels constructed of metal as well as in glass or glass-lined metal. Another type of free radical-generating catalyst which is effective in glass or glass-lined equipment, but which is much less effective in metal apparatus, is that of organic peroxygen compounds, such as benzoyl peroxide. In carrying out the reaction in the presence of actinic light it is preferred to use light having a wave length of 3600 Å or less.

In a preferred method for carrying out the process of this invention, a mixture of a cycloalkene, e. g., cyclohexene, and a halosilane having at least one hydrogen atom joined to the silicon atom, e. g., trichlorosilane, is heated in the presence of a small amount, e. g., from 0.5% to 3% of the weight of the reactants, of a free radical-generating catalyst such as an azo compound of the type defined above, or a mixture of two of such azo compounds. The temperature of the reaction depends on the particular reactants and on the particular catalyst being used. However, temperatures ranging from about 40° C. to up 120° C. are conveniently used. The time of heating should be sufficiently nearly to complete the generation of free radicals from the catalyst, and this in turn depends on the half-life period of the particular catalyst or catalyst mixture being employed. In general, periods of time ranging from one to seventeen hours are sufficient at temperatures ranging from 60 to 115° C. The reaction is preferably carried out under conditions to exclude moisture, as moisture reacts readily with the halosilanes. This is conveniently done when the reaction mixture is a liquid by carrying out the reaction in a reaction vessel fitted with a reflux condenser and by sweeping out the reaction space with dry nitrogen and then continuing the heating at reflux temperature under a slight pressure of dry nitrogen. For example, an excess pressure over atmospheric of 200–760 mm. of mercury is satisfactory. At the completion of the reaction period, the reaction product is separated from any unreacted ingredients by conventional methods such as fractional distillation.

Another embodiment, which is particularly useful when an azo type of catalyst is being used, consists in heating the mixture of the cycloalkene with the halosilane in the presence of the azo catalyst in a closed reaction vessel such as a stainless steel or silver-lined steel reactor, under the autogenous pressure developed by the ingredients. In this embodiment the reactor is preferably agitated by mechanical means to obtain good agitation of the reactants.

Still another embodiment of this invention consists in contacting a cycloalkene with a halosilane and irradiating the mixture with ultraviolet light, i. e., light of wave length below 3600 A, for several hours. The reaction product is then isolated by conventional methods, such as fractional distillation.

The invention is further illustrated by the following examples in which the proportions of the ingredients are expressed in parts by weight unless otherwise specified.

*Example I*

A solution of 50 parts of trichlorosilane, 20 parts of cyclohexene, 1 part of alpha,alpha'-azodiisobutyronitrile, and 1 part of 1,1'-azodicyclohexanecarbonitrile is placed in a stainless steel reactor and heated to 75° C. during a period of one to two hours. The temperature is then raised gradually during a period of 13 hours to 115° C. After cooling, the reaction mixture is removed from the reactor and distilled. After recovery of unchanged starting materials, 39.8 parts of cyclohexyltrichlorosilane, having a boiling point of 200–203° C., is obtained. This corresponds to a yield of 75% of the theoretical based on the cyclohexene used as starting material.

Analysis: Calculated for $C_6H_{10}SiHCl_3$; Si, 12.9%; Cl, 48.9%. Found: Si, 13.4%; Cl, 48.8%.

*Example II*

A mixture of 50 parts of trichlorosilane, 20 parts of cyclohexene, and 2 parts of benzoyl peroxide is placed in a glass reaction vessel fitted with a condenser. After flushing out the reactor with nitrogen the solution is heated until it refluxes, under a nitrogen pressure of 50–60 cm. mercury above atmospheric pressure. Heating is continued for 14 hours under these conditions, the temperature of the reaction mixture ranging from 60 to 63° C. The reaction mixture is then fractionally distilled and there is obtained 35 parts of cyclohexyltrichlorosilane, boiling at 203° C. This corresponds to a yield of 66%, based on the weight of cyclohexene employed.

*Example III*

A mixture of 50 parts of trichlorosilane, 20 parts of cyclohexene, and 2 parts of alpha,alpha'-azobis(alpha,gamma - dimethylvaleronitrile) is heated to refluxing temperature, 60–65° C., for 16 hours under the conditions described in Example II. After this period the reaction mixture is fractionally distilled and there is obtained 6 parts of cyclohexyltrichlorosilane, boiling at 44° C./2 mm. This yield corresponds to 36% of theoretical, based on the amount of cyclohexene consumed in the reaction.

The process of this invention is generic to halosilanes having hydrogen and halogen on the one silicon. Particularly preferred are those halosilanes where the valences of the silicon not satisfied by, i. e., bonded to, hydrogen and halogen are bonded to saturated monovalent hydrocarbon radicals. By "saturated" is meant "free from non-aromatic unsaturation." Of these the saturated radicals aliphatic in character are particularly desirable. The halosilanes useful in the process of this invention include the mono- and dialkyl and mono- and diarylhalosilanes having hydrogen and halogen on the one silicon atom. Specific halosilanes which may be used include $H_2SiCl_2$, $HSiBr_3$, $HSiF_3$, $H_2SiI_2$, $H_3SiCl$
$C_2H_5SiHCl_2$, $(CH_3)_2SiHCl$, $C_6H_5SiHCl_2$ $(C_6H_5)_2SiHCl$. The process of the invention is generic to cycloalkenes including, in addition to the cycloalkene of the examples, cyclopropene, cyclopentene, cyclobutene, 1,5 - cyclooctadiene, cyclooctatetraene, 1,3 - cyclohexadiene, 1,4 - dimethylcyclohexene, 1-propylcyclohexene, 1-methylcyclohexene and 1-amylcyclohexene. Cycloalkenes which are particularly suitable in the process of this invention are those having from three to eight carbon atoms in the ring, and with hydrogen on at least one doubly bonded carbon. These cycloalkenes can also contain lower alkyl substituents (i. e., alkyl groups of one to five carbon atoms) on the cycloalkene nucleus. Thus cycloalkenes of three to eight annular carbons and three to eleven total carbons are particularly suitable.

The relative proportions of the cycloalkenes and halosilanes used in the practice of this invention can be varied over wide limits. They can be used in stoichiometrically equivalent amounts, but since an excess of halosilane tends to minimize side reactions and since the halosilane is readily recovered, it is preferred to use an excess of this reactant. A 50% excess of the halosilane is very suitable.

Example I illustrates the use of a mixture of two particular azo compounds as catalysts in the process of this invention. However, other azo compounds of the type defined above, used either alone or in mixtures, are also effective. A mixture of two different azo catalysts having different decomposition temperatures, i. e., temperatures at which free radicals are liberated, is often advantageous, since this provides a more gradual and smoother reaction between the cycloalkene and the halosilane. The azo compound decomposing at the lower temperature provides the necessary free radicals during the first stage of the reaction at the lower temperature, and the other azo compound decomposing at higher temperature provides the free radicals during the later stages of the reaction at the higher temperatures. Other azo compounds which are suitable for use in the practice of this invention, either alone or in combination, include dimethyl, diethyl, and dihexyl alpha,alpha'-azodiisobutyrate, alpha,alpha'-azodiisobutyramide, which azo compounds can be prepared by the process disclosed in Thiele and Heuser, Ann. 290 1–43 (1896); alpha,alpha' - azobis(alpha - methyl - gamma-carboxybutyronitrile), alpha-alpha'-azobis(alpha - methyl - beta - methoxy - propionitrile), alpha,alpha' - azobis(alpha - gamma - dimethyl - gamma - ethoxyvaleronitrile), alpha,-alpha' - azobis(alpha - methyl - gamma - diethylaminobutyronitrile) alpha,alpha' - azobis-(alpha - methylcaprylonitrile), alpha,alpha-' azobis(alpha-cyclopropylpropionitrile), alpha,-alpha' - azobis(alpha,beta,beta - trimethyl - butyronitrile), alpha,alpha'-azobis(alpha-cyclohexylpropionitrile), alpha,alpha'-azobis-(alpha-phenylpropionitrile), which azo compounds can be prepared by the process disclosed by Alderson and Robertson in their U. S. application Serial No. 736,586; 1,1'-azodicyclopentanecarbonitrile, which can be prepared by the process of Hartmann, Rec. trav. chim. 46 150–153 (1927); Chem. weekblad 23 77–78, January 1926; alpha-(carbamylazo)isobutyronitrile, carbamylazoisobutyramide, carbamylazo - alpha,gamma - dimethylvaleramide, carbamylazohexyl - alpha,gamma-dimethyl-valerate, which azo compounds can be prepared by the method described by Robertson in his U. S. application Serial No. 757,683; and the polymeric azo nitrile from 2,15-cetanedione having the formula

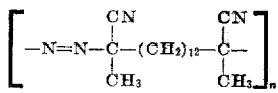

These azo compounds may be prepared by the general procedures described by Thiele and Stange, Ann. 283, 33–37 (1894); Robertson Serial No. 757,683, filed June 27, 1947; Thiele and Heuser, Ann. 290, 1–43 (1896); Hartmann, Rec. trav. chim. 46, 150–153 (1927); Chem. weekblad 23, 77–78, January 1926; Dox. J. A. C. S. 47, 1471–1477 (1925); and Alderson and Robertson Serial No. 736,586, filed March 22, 1947. In the process of the Alderson and Robertson application Serial No. 736,586 the azine of an oxy carbonyl compound (aldehyde or ketone) of not more than 12 carbons is treated with an excess of hydrogen cyanide in a system containing not more than 50% water at room temperature or above. The resulting hydrazonitrile is then oxidized to the azonitrile by an oxidizing agent such as chloride or bromine in the presence of an acid such as hydrochloric acid. In the process of the Robertson application Serial No. 757,683 hydrogen cyanide is added to the semicarbazone of a ketone followed by oxidation of the resulting semicarbazodinitrile with potassium permanganate. This particular method is an improvement on the process of Thiele and Stange, loc. cit. The Alderson and Robertson application Serial No. 736,586, has issued as U. S. Patent 2,469,358.

These azo compounds can be used in proportions ranging from about 0.01% up to 10% of the weight of the cycloalkene and halosilane in the reaction mixture. However, they are usually used in proportions ranging from about 0.5% to 3% of the weight of the reactants.

Although the azo compounds are the preferred type of catalyst for use in this reaction, other free radical-liberating compounds can be employed. Examples of these are the peroxygen-containing organic compounds, such as benzoyl peroxide, acetyl peroxide, tertiary-butyl hydroperoxide, di-tertiary-amyl peroxide, tertiary-butyl-1-methylcyclohexyl peroxide, tertiary-butyl pentamethylethyl peroxide, di-tertiary-butyl peroxide, di-tertiary-butyl diperphthalate, and 1-hydroxyethyl hydroperoxide-1. These peroxide catalysts are also used in small proportions based on the weight of the reactants, amounts ranging from 0.01% to 10% of the reactants being suitable. However when employing the peroxide type of catalyst in this reaction it is preferable that the reactants be heated in a glass vessel or glass-lined reaction vessel, since these catalysts are much less effective in stainless steel or silver-lined metal apparatus.

The cycloalkylhalosilanes of this invention, particularly cyclohexyltrichlorosilane, are particularly useful as chemical intermediate for the formation of siliconic acids which are in turn useful in the modification of synthetic resins.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A process for the preparation of organo-silicon compounds wherein cyclohexene is heated for 13 hours at a temperature rising from 75° C. to 115° C. with trichlorosilane in the presence of a mixture of alpha,alpha'-azodiisobutyronitrile and 1,1'-azodicyclohexanecarbonitrile and cyclohexyltrichlorosilane is isolated.

2. A process for the preparation of organo-silicon compounds wherein a cycloalkene containing but one olefinic bond is heated for from one to seventeen hours at 60–115° C. with a silicon compound having one silicon atom to which is attached a hydrogen atom and a halogen atom, any remaining valence of the silicon being satisfied by a monovalent hydrocarbon radical free from non-aromatic unsaturation in the presence of an azo compound aliphatic in character wherein both valences of the acyclic azo,

group are attached to different carbon atoms which are non-aromatic, and at least one of which is tertiary, which tertiary carbon has further bonded to it through another carbon a negative substituent in which the three remaining valences of the latter carbon are satisfied by at least one element of atomic number 7 to 8.

3. A process for the preparation of organo-silicon compounds wherein cyclohexene is heated at 60–115° C. for one to seventeen hours in the presence of an azo compound aliphatic in character wherein both valences of the acyclic azo, —N=N—, group are attached to different non-aromatic carbon atoms, at least one of which is tertiary and bonded to a cyano, —CN, group with a halosilane having only halogen and hydrogen on the one silicon atom.

4. A process for the preparation of organo-silicon compounds wherein a cycloalkene containing but one olefinic double bond is heated at 60–115° C. for one to seventeen hours in the presence of an azo compound aliphatic in character wherein both valences of the acyclic azo, —N=N—, group are attached to different non-aromatic carbon atoms, at least one of which is tertiary and bonded to a cyano, —CN, group with a halosilane having only halogen and hydrogen on the one silicon atom.

5. A process for the preparation of organo-silicon compounds wherein a cycloalkene containing but one olefinic double bond is heated at 60–115° C. for one to seventeen hours with a halosilane having only halogen and hydrogen on the one silicon atom in the presence of a non-aromatic azo compound wherein both valences of the acyclic azo, —N=N—, group are attached to different tertiary carbons each attached to a cyano group, the azo compound containing only carbon, hydrogen, and the azo and cyano nitrogens.

6. A process for the preparation of organo-silicon compounds wherein a cycloalkene containing but one olefinic double bond is heated at 60–115° C. for one to seventeen hours with a halosilane having only halogen and hydrogen on the one silicon atom in the presence of a non-aromatic azo compound wherein both valences of the acyclic azo, —N=N—, group are attached to discrete monovalent cyanohydrocarbon radicals wherein the cyano group is on tertiary carbon from which stems the free valence of the cyanohydrocarbon radical.

7. A process for the preparation of organosilicon compounds wherein a cycloalkene containing but one olefinic double bond is heated at 60–115° C. for one to seventeen hours with a halosilane having only halogen and hydrogen on the one silicon atom in the presence of a non-aromatic azo compound wherein both valences of the acyclic azo, —N=N—, group are attached to discrete cyanoalkyl groups wherein the cyano group is on tertiary carbon from which stems the free valence of the cyanohydrocarbon radical.

MAURICE LEON ERNSBERGER.
ROBERT DE WALD LIPSCOMB.

REFERENCES CITED

The following references are of record in the file of this patent:

UNITED STATES PATENTS

| Number | Name | Date |
|---|---|---|
| 2,299,441 | Vaughan | Oct. 20, 1942 |
| 2,324,249 | Vaughan | July 13, 1943 |
| 2,379,821 | Miller | July 3, 1945 |
| 2,405,019 | Dalin | July 30, 1946 |
| 2,407,181 | Scott | Sept. 3, 1946 |
| 2,443,898 | Ellingboe | June 22, 1948 |
| 2,471,959 | Hunt | May 31, 1949 |
| 2,524,529 | Krieble | Oct. 3, 1950 |

OTHER REFERENCES

Sommer: J. A. C. S., vol 69 (1947), page 188.

Burkhard: J. A. C. S., vol. 69 (1947), pages 2687–2689.

Barry: J. A. C. S., vol. (1947), page 2916.

Pietrusza: J. A. C. S., vol. 70 (1948), pages 484–486.

Certificate of Correction

Patent No. 2,570,463                                                    October 9, 1951

MAURICE LEON ERNSBERGER ET AL.

It is hereby certified that error appears in the printed specification of the above numbered patent requiring correction as follows:

Column 2, line 25, for "sufficiently" read *sufficient*; column 5, line 30, for "chloride" read *chlorine*; column 5, line 35, for "semicarbazodinitrile" read *semicarbazidonitrile*;

and that the said Letters Patent should be read as corrected above, so that the same may conform to the record of the case in the Patent Office.

Signed and sealed this 22nd day of January, A. D. 1952.

[SEAL]

THOMAS F. MURPHY,
*Assistant Commissioner of Patents.*